United States Patent
Iijima

(10) Patent No.: US 9,878,389 B2
(45) Date of Patent: Jan. 30, 2018

(54) METHOD AND APPARATUS FOR MANUFACTURING ALUMINUM PRODUCT

(71) Applicant: DENSO CORPORATION, Kariya, Aichi-pref. (JP)

(72) Inventor: Masahiro Iijima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 60 days.

(21) Appl. No.: 14/906,278

(22) PCT Filed: Jul. 21, 2014

(86) PCT No.: PCT/JP2014/003835
§ 371 (c)(1),
(2) Date: Jan. 20, 2016

(87) PCT Pub. No.: WO2015/011912
PCT Pub. Date: Jan. 29, 2015

(65) Prior Publication Data
US 2016/0175957 A1  Jun. 23, 2016

(30) Foreign Application Priority Data
Jul. 26, 2013 (JP) .................. 2013-155679

(51) Int. Cl.
*B23K 37/00* (2006.01)
*C23C 22/00* (2006.01)
(Continued)

(52) U.S. Cl.
CPC .............. *B23K 1/0012* (2013.01); *B23K 1/19* (2013.01); *B23K 1/20* (2013.01); *B23K 37/003* (2013.01);
(Continued)

(58) Field of Classification Search
None
See application file for complete search history.

(56) References Cited

U.S. PATENT DOCUMENTS 3,451,114 A    6/1969  Werneke
5,055,019 A *  10/1991  Meyer ................... C01F 7/448
                                                  423/625

(Continued)

FOREIGN PATENT DOCUMENTS

| EP | 1142663 A1 | 10/2001 |
| GB | 1076140 A | 7/1967 |
| JP | 59-197571 A | 11/1984 |
| JP | 2004233011 A | 8/2004 |
| JP | 2011110438 A | 6/2011 |

OTHER PUBLICATIONS

International Search Report and Written Opinion (in Japanese with English Translation) for PCT/JP2014/003835, dated Oct. 21, 2014; ISA/JP.

*Primary Examiner* — Devang R Patel
(74) *Attorney, Agent, or Firm* — Harness, Dickey & Pierce, P.L.C.

(57) ABSTRACT

A method for manufacturing an aluminum product includes a spraying step, in which a workpiece heated at a brazing step is cooled by spraying of a process liquid on the workpiece, as a boehmite treatment step after the brazing step. After the brazing step, the workpiece has been heated for brazing. A surface of the workpiece can be changed into boehmite having corrosion resistance by the spraying of the process liquid on the heated workpiece so as to contact a water molecule. Moreover, the process liquid sprayed can be dried by the heat of the workpiece. Accordingly, the brazing step, a surface treatment step and a drying step can be performed in a consecutive line.

7 Claims, 1 Drawing Sheet

(51) Int. Cl.
  *B23K 1/00* (2006.01)
  *C23C 22/68* (2006.01)
  *C23C 22/76* (2006.01)
  *B23K 1/19* (2006.01)
  *B23K 1/20* (2006.01)
  *F28F 21/08* (2006.01)
  *B23K 103/10* (2006.01)
  *B05D 3/02* (2006.01)

(52) U.S. Cl.
  CPC .............. *C23C 22/68* (2013.01); *C23C 22/76* (2013.01); *F28F 21/084* (2013.01); *B05D 3/0218* (2013.01); *B05D 2202/25* (2013.01); *B23K 2203/10* (2013.01); *F28F 2275/04* (2013.01)

(56) References Cited

U.S. PATENT DOCUMENTS

| | | | | |
|---|---|---|---|---|
| 5,190,596 | A * | 3/1993 | Timsit | B23K 35/286 |
| | | | | 148/23 |
| 5,481,084 | A * | 1/1996 | Patrick | B22D 11/008 |
| | | | | 148/222 |
| 6,422,451 | B2 * | 7/2002 | Bendall | B23K 1/0012 |
| | | | | 228/183 |
| 7,503,381 | B2 * | 3/2009 | Inbe | C09D 5/086 |
| | | | | 165/133 |
| 2001/0023889 | A1 | 9/2001 | Bendall et al. | |
| 2014/0069620 | A1 * | 3/2014 | Takaswa | F28F 19/04 |
| | | | | 165/133 |

\* cited by examiner

METHOD AND APPARATUS FOR MANUFACTURING ALUMINUM PRODUCT

CROSS REFERENCE TO RELATED APPLICATIONS

This application is a U.S. National Phase Application under 35 U.S.C. 371 of International Application No. PCT/JP2014/003835 filed on Jul. 21, 2014 and published in Japanese as WO 2015/011912 A1 on Jan. 29, 2015. This application is based on and claims the benefit of priority from Japanese Patent Application No. 2013-155679 filed on Jul. 26, 2013. The entire disclosures of all of the above applications are incorporated herein by reference.

TECHNICAL FIELD

The present disclosure relates to a method and an apparatus for manufacturing an aluminum product having a configuration in which multiple members are brazed.

BACKGROUND ART

Conventionally, aluminum that is superior in heat conductance is used in a heat exchanger. In a technology of chemical conversion coating for such heat exchanger, a workpiece is immersed in a liquid for chemical conversion coating which includes a low pH acid or high pH base in addition to fluorine or nitrogen. Accordingly, a rust preventive film is formed, and thus a large volume of wastewater has been discharged. For example, in a treatment technology for a heat exchanger which is described in Patent Document 1, aluminum is processed by a boehmite treatment so that a rust preventiveness becomes higher, and a catalyst metal is supported by the aluminum.

In the above-mentioned technology described in Patent Document 1, the workpiece at ordinary temperature needs to be heated again, for the boehmite treatment, at a hot water treatment process or a steam contacting process. Moreover, in a catalyst attachment process, the workpiece is required to be immersed in a liquid containing a catalyst and be dried. A surface treatment process is needed for attaching a rust resistant metal to the workpiece. Those processes may have been unsuitable for a consecutive production line from an assembly step and a brazing step of the heat exchanger. Moreover, the surface treatment process is essential, because the aluminum may be corroded if the surface treatment is skipped.

PRIOR ART DOCUMENT

Patent Document

Patent Document 1: Japanese Patent No. 2011-110438

SUMMARY OF THE INVENTION

The present disclosure is done with consideration of the above-described points, and it is an objective to provide a method and an apparatus for manufacturing an aluminum product, in which a surface treatment process and a drying process can be performed consecutively from a brazing process.

According to an aspect of the present disclosure, in a method for manufacturing an aluminum product including aluminum or aluminum alloy, a member including aluminum or aluminum alloy is blazed by melting a brazing filler metal attached to the member via heating of the member. In the manufacturing method, a process liquid is sprayed on the member after the brazing and before the member heated in the brazing is cooled to ordinary temperature.

According to another aspect of the present disclosure, a manufacturing apparatus manufactures an aluminum product including aluminum or aluminum alloy. The manufacturing apparatus includes a brazing device that brazes a member including aluminum or aluminum alloy by melting a brazing filler metal attached to the member via heating of the member, and a spray device that sprays the process liquid on the member after the brazing and before the member heated by the brazing device is cooled to ordinary temperature.

According to this, after the brazing, the member that has been heated in the brazing is cooled by the spraying of the process liquid. After the brazing, the member is at high temperature due to the brazing. Before the member is cooled to ordinary temperature, the process liquid is sprayed on the member. Therefore, a surface of the member can be changed into boehmite having corrosion resistance by contacting a water molecule. Since the process liquid is sprayed on the member, an amount of discharged wastewater can be made to be small as compared to a case where the member is immersed in the process liquid. Moreover, decrease in temperature of the member can be limited by adjusting a time of spraying of the process liquid. Therefore, when the spraying has been finished with keeping the member at high temperature, the process liquid sprayed can be dried by the heat of the member. Accordingly, drying is not necessary. According to this, a surface treatment process and a drying process can be performed consecutively from a brazing process, and thus a manufacturing time can be shortened.

EMBODIMENTS FOR EXPLOITATION OF THE INVENTION

Figure 1:
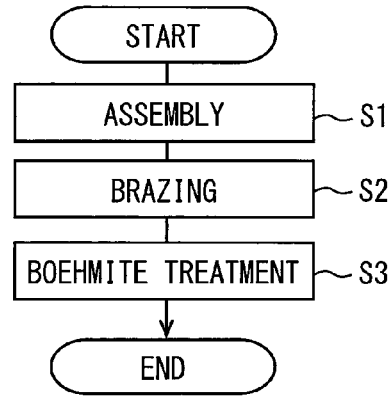
FIG. 1 is a flowchart illustrating a method for manufacturing a heat exchanger according to an embodiment of the present disclosure.
Figure 2:
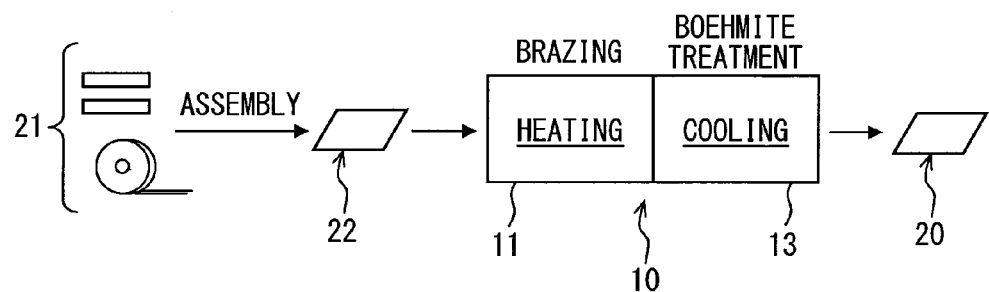
FIG. 2 is a schematic diagram illustrating the manufacturing method according to the embodiment.

An embodiment of the present disclosure will be described referring to FIGS. 1-3. A heat exchanger 20 is configured to perform heat exchange between a fluid flowing inside and a fluid flowing outside, e.g. air. The heat exchanger 20 is an aluminum product in which at least a core portion performing heat exchange includes aluminum or aluminum alloy.

The heat exchanger 20 is called as, for example, evaporator, condenser, radiator or heater core according to the use purpose. The heat exchanger 20 includes multiple components 21 including aluminum that is superior in heat conductance. The multiple components 21 are a side plate, a tank, a tube, a fin and so on. These components 21 are brazed by a brazing method (nocolok method) using a non-corrosive flux, or a brazing method (vacuum brazing method) using vacuum atmosphere.

Next, a method for manufacturing the heat exchanger 20 will be described referring to FIGS. 1 and 2. The manufacturing of the heat exchanger 20 is started after the components 21 for manufacturing the heat exchanger 20 are prepared, and a process of step S1 shown in FIG. 1 is performed. An assembly process is performed at step S1, and then a process of step S2 is performed. In the assembly process, the components 21 such as a side plate, a tank, a tube, a fin and so on are assembled so as to have a predetermined positional relationship, and thus a workpiece 22 is obtained. In other words, the workpiece 22 is an example of a member obtained by assembling the multiple components 21.

A brazing process is performed at step S2, and then a process of step S3 is performed. In the brazing process, the workpiece 22 is heated such that a brazing filler metal preliminarily attached to the workpiece 22 is melted, and thereby the workpiece 22 is brazed. In the brazing process, the multiple components 21 configuring the workpiece 22 are brazed with each other in a manufacturing apparatus 10. Specifically, the workpiece 22 is loaded in a brazing furnace 11 that is a brazing device, and being heated at about 600° C., for example.

A boehmite treatment process is performed at step S3, and this flow is ended. In the boehmite treatment process, boehmite is formed on a surface of the workpiece 22 in the manufacturing apparatus 10. Specifically, the boehmite treatment process is achieved by a spraying process in which a process liquid is sprayed on the workpiece 22 such that the workpiece 22 heated in the brazing furnace 11 is cooled. The workpiece 22 ejected from the brazing furnace 11 at step S2 is hot and is at or below 600° C., and the workpiece 22 has passed through a low-oxygen process. Therefore, an oxide is not formed on the surface of the workpiece 22 including aluminum. A spray nozzle 13 sprays the process liquid on one side or both sides of the workpiece 22 that is in a high temperature condition. According to this, the boehmite that is a hydroxide of aluminum can be formed on the surface of the workpiece 22. When the surface of the workpiece 22 is changed into the boehmite, corrosion resistance can be obtained without a surface treatment due to fine surface characteristics of the boehmite.

The heat exchanger 20 in which the boehmite is formed on the surface is manufactured by such manufacturing method of the heat exchanger 20. Therefore, the heat exchanger 20 includes a brazed portion which is obtained via brazing by heating the workpiece 22 so as to melt the brazing filler metal preliminarily attached to the workpiece 22, and a boehmite layer which is formed on at least one portion of the surface of the workpiece 22 by spraying the process liquid after the brazed portion is formed.

Figure 3:
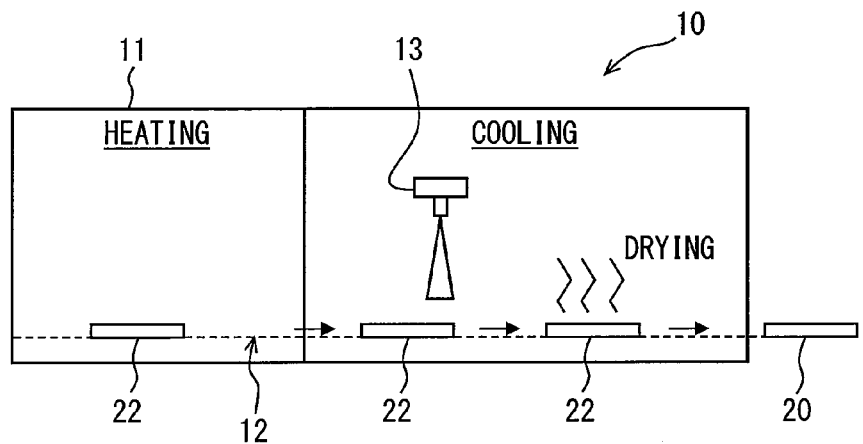
FIG. 3 is a schematic diagram illustrating a manufacturing apparatus according to the embodiment.

Next, the boehmite treatment process will be further described referring to FIG. 3. The workpiece 22, which is assembled at the step S1 and has a plate shape, is sent to the brazing furnace 11 of the manufacturing apparatus 10 by a transfer device 12 such as a belt conveyer. The workpiece 22 having a plate shape is transferred in condition where a surface having a largest area is positioned on an underside. The workpiece 22 is transferred by the transfer device 12 without stopping even in the brazing furnace 11, and moves continuously. The workpiece 22 is heated up to about 600° C. during transferring, and thus the brazing process is performed. The workpiece 22 that has moved out of the brazing furnace 11 keeps on moving in the manufacturing apparatus 10 by the transfer device 12 without stopping. As shown in FIG. 3, the workpiece 22 heated in the brazing process is transferred without stopping to directly under the spray nozzle 13 that is a spray device, and the process liquid is sprayed from the spray nozzle 13 on the workpiece 22.

The spray nozzle 13 sprays the process liquid on a spray area which has a long and thin shape (belt-like shape) and extends in a direction intersecting with a moving direction of the workpiece 22. The spray area extends throughout the whole area of the workpiece 22 in the direction (i.e. width direction) intersecting with the moving direction of the workpiece 22. Accordingly, the process liquid is sprayed on a partial area of the workpiece 22 in the moving direction, which extends in the width direction of the workpiece 22. Therefore, according to the motion of the workpiece 22, the spray area moves from a foremost part of the workpiece 22 in the moving direction to a backmost part. According to this, the process liquid is sprayed on a whole area of an upper surface of the workpiece 22. The process liquid is sprayed only on the upper surface of the workpiece 22 in FIG. 3, but the process liquid may cool the workpiece 22 by being sprayed on both the upper surface and a lower surface of the workpiece 22 instead of only the upper surface of the workpiece 22. In other words, the spray nozzle 13 may cool the workpiece 22 by spraying on the both sides in a thickness direction of the workpiece 22.

The process liquid is water, for example. The process liquid may include a compound of corrosion resistant metal or an air cleaning catalyst. When a metal having a gas cleaning catalysis is attached to the heat exchanger 20, elements contained in an air passing through a core portion can be cleaned when the heat exchanger 20 is used. The air cleaning catalyst is at least one selected from $MnO_2$, $CeO_2$, $Fe_2O_3$, $Co_3O_4$, NiO, $Ag_2O$, $Cr_2O_3$, $V_2O_5$, CuO and $MoO_3$, for example. When the compound of the corrosion resistant metal is attached, a corrosion of the heat exchanger 20 is limited. The compound of the corrosion resistant metal is selected from Zr, V and Ti, for example.

The spray amount of the process liquid is changed according to a size and a transfer speed of the workpiece 22, and being 360 L/min (6 $dm^3$/s), for example. The transfer speed of the workpiece 22 is 50 mm/s, for example. A temperature of the process liquid is ordinary temperature. When the workpiece 22 is cooled rapidly by the process liquid, a distortion may occur because of a difference in temperature between a part that has been cooled and a part that has not been cooled yet. Moreover, when the process liquid is at high temperature, the workpiece 22 is partially heated by the process liquid, and Si may precipitate on the surface. Accordingly, the process liquid is set to be ordinary temperature (room temperature).

Spraying of the process liquid is performed during a period when the temperature of the workpiece 22 is at or above an evaporation temperature, e.g. 100° C., of the process liquid. In other words, the spraying of the process liquid is stopped, before the temperature of the workpiece 22 becomes below the evaporation temperature, i.e. when the temperature of the workpiece 22 is still at or above the evaporation temperature. When the spray nozzle 13 is fixed, and when the workpiece 22 is transferred, the workpiece 22 passes through the spray area of the spray nozzle 13 at or above the evaporation temperature. According to this, the process liquid attached to the workpiece 22 is dried by a heat of the workpiece 22 itself after the workpiece 22 passes through the spray nozzle 13. Therefore, a subsequent drying process becomes unnecessary. Furthermore, a wastewater is discharged when a immersing process is performed, but the spraying of the process liquid is capable of reducing the discharge of the wastewater to a maximum extent.

As described above, the method for manufacturing the heat exchanger 20, according to the present embodiment, includes the spraying process as the boehmite treatment process after the brazing process. In the spraying process, the workpiece 22 is cooled by the spraying of the process liquid after the workpiece 22 is heated in the brazing process and before the workpiece 22 is cooled to ordinary temperature. After the brazing process, the workpiece 22 has been heated for brazing. Through such heating and the spraying of the process liquid on the workpiece 22 in a high temperature condition, a water molecule is made to contact the workpiece 22, and thus the boehmite having corrosion resistance can be formed on the surface of the workpiece 22. In other words, aluminum of the surface of the workpiece 22 can be changed into boehmite by the spraying of the process liquid. Since the process liquid is sprayed, the amount of the wastewater can be made to be small as compared to a case where the workpiece 22 is immersed in the process liquid.

A temperature decrease of the workpiece 22 can be limited by adjusting a time of the spraying of the process liquid. Therefore, when the spraying has been finished with keeping the workpiece 22 at high temperature, the process liquid sprayed can be dried by the heat of the workpiece 22. Accordingly, drying becomes unnecessary. According to this, a surface treatment process and the drying step can be performed consecutively from the brazing process, and thus a manufacturing time can be shortened. Therefore, productivity can be improved. Moreover, since manufacturing is performed from the brazing process to the drying process continuously, a space for setting the manufacturing apparatus 10 can be made to be small.

A demand to make the surface treatment unnecessary for reducing a manufacturing cost of the heat exchanger 20 and a demand to obtain corrosion resistance have a trade-off relationship normally. However, in the present embodiment, since corrosion resistance of aluminum is improved just by spraying of the process liquid, the boehmite treatment of the heat exchanger 20 can be achieved by a simple process that is the spraying of the process liquid. Therefore, an expensive surface treatment process can be made to be unnecessary with securing corrosion resistance.

In the present embodiment, misty water, water vapor or water, which includes a metal having a rust resistant effect or a metal having catalysis, is sprayed on the hot workpiece 22 immediately after brazing. According to this, the surface of the aluminum is changed into boehmite, and the rust resistant metal or the catalyst can be attached to and supported by the boehmite, and whereby a reheating for the boehmite treatment can be skipped.

In other words, in the manufacturing method of the present embodiment, water molecule is made to be in contact with the workpiece 22 at high temperature by spraying misty water or water vapor on the hot workpiece 22 at or below about 600° C. in a cooling area that is subsequent to a heating area of the brazing process in the manufacturing apparatus 10. According to this, the surface of aluminum of the heat exchanger 20 can be changed into boehmite having corrosion resistance without discharging water and reheating. When the spraying on the workpiece 22 is stopped at or above the evaporation temperature, e.g. 100° C., the water sprayed is dried by the heat of the workpiece 22. Therefore, drying of the workpiece 22 also becomes unnecessary. When water mixed with a metal salt having rust resistance or catalysis is sprayed, these metals can be supported by the workpiece 22 at the same time as boehmite is formed on the surface of aluminum. According to this, rust resistance treatment and catalyst attachment can be done without a treatment immersing in acid, base or a liquid for chemical conversion coating, and without discharging wastewater including fluorine or nitrogen.

A preferred embodiment is described above, but the present disclosure is not limited to the above-described embodiment at all. The present disclosure can be modified in many ways to implement as long as not exceeding the scope of the present disclosure.

The configuration of the above-described embodiment is just an example, the scope of the present disclosure is not limited to scope of these descriptions.

In the above-described embodiment, the aluminum product is the heat exchanger 20, but not limited to the heat exchanger 20, and may be any product having a component including aluminum or aluminum alloy.

In the above-described embodiment, the workpiece 22 is transferred, and the processes are performed in order by flow production. However, the manufacturing method and manufacturing apparatus 10 are not limited to those in which the workpiece 22 is transferred. For example, the workpiece 22 may be fixed, and the spray nozzle 13 may move with respect to the workpiece 22.

In the above-described embodiment, the process liquid is sprayed on the workpiece 22 when the workpiece 22 is at or above the evaporation temperature, e.g. 100° C., of the process liquid. In this case, the metal having a rust resistant effect or the metal having catalysis, which is contained in the process liquid, can be effectively combined with aluminum of the workpiece 22 with vaporizing moisture. When the temperature of the workpiece 22 becomes lower than 100° C., the moisture may be vaporized by reheating the workpiece 22 at or above 100° C.

What is claimed is:

1. A method for manufacturing an aluminum product including aluminum or aluminum alloy, the method comprising:
   brazing a member including aluminum or aluminum alloy by melting a brazing filler metal attached to the member via heating of the member at a brazing temperature; and
   cooling the member which has the brazing temperature due to the heating and simultaneously forming a boehmite layer on a surface of the member by spraying a process liquid on the member after the brazing and before the member heated in the brazing is cooled to ordinary temperature, wherein the process liquid includes at least one corrosion-resistant metal selected from Zr, V, and Ti, or at least one air cleaning catalyst selected from $MnO_2$, $CeO_2$, $Fe_2O_3$, $Co_3O_4$, NiO, $Ag_2O$, $Cr_2O_3$, $V_2O_5$, CuO and $MoO_3$.

2. The method for manufacturing an aluminum product, according to claim 1, wherein the spraying is performed when a temperature of the member is at or above an evaporation temperature of the process liquid.

3. The method for manufacturing an aluminum product, according to claim 1, wherein the process liquid includes water.

4. The method for manufacturing an aluminum product, according to claim 1, further comprising
   assembling a plurality of components to obtain the member before the brazing of the member, wherein
   the aluminum product is a core portion of a heat exchanger.

5. The method for manufacturing an aluminum product, according to claim 1, wherein
   the member has a plate shape, and
   the process liquid is sprayed on both sides of the member with respect to a thickness direction of the member in the spraying.

6. A method comprising:

heating a member including aluminum or an aluminum alloy to a brazing temperature;

brazing the member by melting a brazing filler metal attached to the member at the brazing temperature; and spraying a process liquid on the member at the brazing temperature to cool the member and simultaneously form a boehmite layer on a surface of the member, the boehmite layer being formed on the surface of the member before the member is cooled to a room temperature, wherein the process liquid includes at least one corrosion-resistant metal selected from Zr, V, and Ti, or at least one air cleaning catalyst selected from $MnO_2$, $CeO_2$, $Fe_2O_3$, $Co_3O_4$, NiO, $Ag_2O$, $Cr_2O_3$, $V_2O_5$, CuO and $MoO_3$.

7. The method of claim 6, wherein the process liquid includes water.

\* \* \* \* \*